(12) United States Patent
Weldy

(10) Patent No.: US 7,085,007 B2
(45) Date of Patent: *Aug. 1, 2006

(54) DIGITAL COLOR IMAGE PROCESSING METHOD

(75) Inventor: John A. Weldy, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 966 days.

This patent is subject to a terminal disclaimer.

(21) Appl. No.: 10/101,657

(22) Filed: Mar. 20, 2002

(65) Prior Publication Data

US 2003/0179391 A1    Sep. 25, 2003

(51) Int. Cl.
*G06K 15/00* (2006.01)

(52) U.S. Cl. .................. 358/1.9; 358/518; 358/2.1; 358/520; 358/522; 358/530

(58) Field of Classification Search ............... 358/518, 358/2.1, 520, 522, 530, 1.9
See application file for complete search history.

(56) References Cited

U.S. PATENT DOCUMENTS

| | | | |
|---|---|---|---|
| 4,677,465 A | 6/1987 | Alkofer | 358/80 |
| 4,729,016 A | 3/1988 | Alkofer | 358/80 |
| 4,731,671 A | 3/1988 | Alkofer | 358/284 |
| 4,984,071 A | 1/1991 | Yonezawa | 358/80 |
| 5,062,058 A | 10/1991 | Morikawa | 364/521 |
| 5,265,200 A | 11/1993 | Edgar | 395/131 |
| 5,555,022 A | 9/1996 | Haruki et al. | 348/223 |
| 5,673,336 A | 9/1997 | Edgar et al. | 382/167 |
| 5,812,286 A * | 9/1998 | Lin | 358/519 |
| 5,926,562 A * | 7/1999 | Hyodo et al. | 382/167 |
| 2003/0002059 A1* | 1/2003 | Zaklika et al. | 358/1.9 |

FOREIGN PATENT DOCUMENTS

| | | |
|---|---|---|
| EP | 0 603 908 A2 | 6/1994 |
| EP | 0 603 908 A3 | 6/1994 |
| EP | 0 967 791 A2 | 12/1999 |
| EP | 0 967 791 A3 | 12/1999 |

OTHER PUBLICATIONS

Patent Abstracts of Japan, vol. 2000, No. 20, Jul. 10, 2001, & JP 2001 069352 A (Canon Inc), Mar. 16, 2001 *abstract; figures 4-9* *paragraph '0023! —paragragh '0039!*.
Patent Abstracts of Japan, vol. 2002, No. 02, Apr.2, 2002 — & JP 2001 292332 A (Seiko Epson Corp), Oct. 19, 2001 *abstract; figures 1-16* *paragraph '0057! —paragraph '0077!*.

* cited by examiner

*Primary Examiner*—David Moore
*Assistant Examiner*—Michael Burleson
(74) *Attorney, Agent, or Firm*—David M. Woods

(57) ABSTRACT

A method for adjusting the color reproduction of a color image composed of pixels provided in a plurality of color channels is based on generating a reference image from a combination of the color channels, whereby each spatial coordinate of the reference image is characterized by a reference image level. Channel averages of the color channel values of the pixels that correspond to each of at least two different valued reference image levels are generated. Specific channel averages are obtained corresponding to a near white point and a near black point from the channel averages. The specific channel averages are utilized on a pixel by pixel basis for the respective channels of the digital color image to produce a processed digital color image having improved color reproduction.

20 Claims, 4 Drawing Sheets

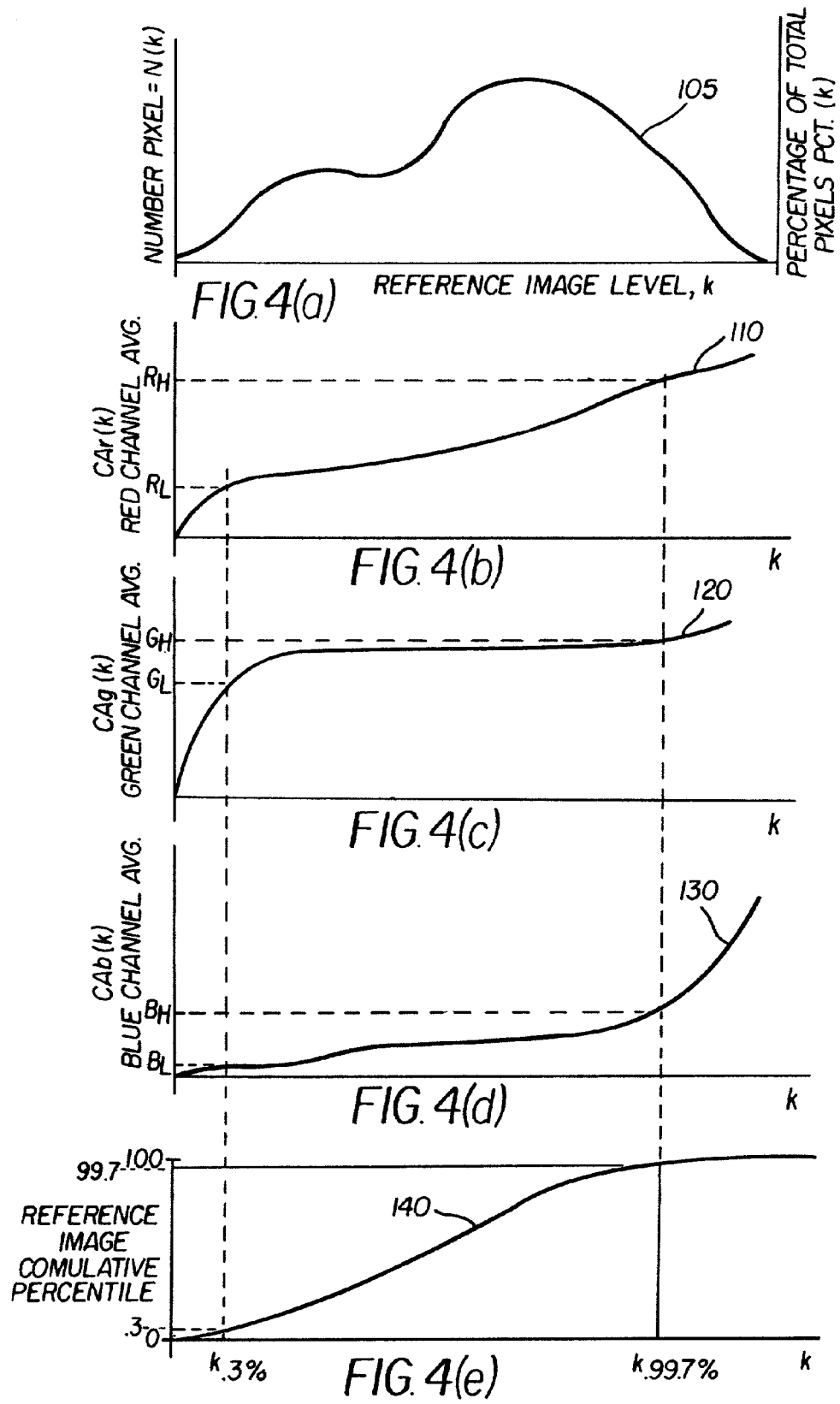

DIGITAL COLOR IMAGE PROCESSING METHOD

FIELD OF THE INVENTION

The present invention relates to methods of processing digital color images, and more particularly to a method of adjusting the color reproduction of a digital color image.

BACKGROUND OF THE INVENTION

In photographic printing of film, such as a color photographic negative, it is a well-known practice to 'correct' the color balance by causing the overall color balance of the print to be a shade near gray. This correction strategy is based on the assumption that the overall average of the scene integrates to a gray color and is very effective at reducing the effects resulting from different scene illuminants that are spectrally different such as tungsten and daylight. In a like manner, image sensing apparatus such as a video camera averages color difference signals, R-Y and B-Y, over a time period to a zero value. This is equivalent to integrating to gray.

These methods work well for the majority of scene and illuminant combinations. However, when the scene subject matter is highly colored, particularly with a single dominant color, the 'integrate to gray' strategy fails as this dominant scene color is mistaken for an illuminant bias. This failure, known as subject failure, produces unpleasant colored casts in the color complementary to the dominant scene color. There are various strategies for minimizing these failures. These strategies are typically based on reducing the amount of correction based on a population of images and/or on the information in neighboring frames. Other color problems result from fading of the dyes in a photographic image, printing and processing errors, film keeping problems, and, in the case of a color digital image that is captured directly with an electronic camera, an improperly adjusted black or white point in the camera.

With a digital color image obtained either directly from an electronic camera or indirectly by scanning a photographic print or film, it is possible to manually adjust the color balance by using any of the well known digital photographic manipulation tools, such as those provided by Adobe Photoshop®. However, manual adjustment is not practical for automated printing of digital images. A digital image provides much information that can be used for calculating color adjustments, and several methods have been proposed for performing these adjustments automatically. Some of these methods, such as that taught in U.S. Pat. No. 5,555,022 issued Sep. 10, 1996 to Haruki et al., divide the scene information into a plurality of regions or blocks representing different locations within a scene. Means to select and weight the correction of these blocks are then employed to provide automatic white balancing and to restrict the degree to which color correction gain is applied. U.S. Pat. No. 4,984,071 issued Jan. 8, 1991 to Yonezawa teaches a method for adjusting a gradation curve based on identifying shadow and highlight points by utilizing histogram data. U.S. Pat. No. 5,062,058 issued Oct. 29, 1991 to Morikawa describes a system that uses a cumulative histogram to designate highlight and shadow points. Other histogram based methods are taught by U.S. Pat. No. 5,812,286 issued Sep. 22, 1998 to Lin, and U.S. Pat. No. 5,265,200 issued Nov. 23, 1993 to Edgar. Edgar further describes a method for performing a second order best fit regression of the histogram data and includes methods to eliminate some histogram values from consideration in the regression.

Another approach that combines color correction with tone scale corrections is based on random sampling within a digitized image and subsequently modifying the resulting histogram of these samples. Commonly assigned U.S. Pat. No. 4,677,465 issued Jun. 30, 1987 to Alkofer, and commonly assigned U.S. Pat. No. 4,729,016 issued Mar. 1, 1988 to Alkofer, disclose relatively complex methods that utilize these samples in a plurality of segmented contrast intervals through normalization techniques and with comparison to image population data.

Other channel independent histogram methods, such as that taught by Lin in the aforementioned U.S. Pat. No. 5,812,286, feature independent color channel tone scale adjustment based on an additional parameter, such as the channel median. This allows a channel independent shaping of the color tone scale by a curve such as a gamma curve.

Many of the above cited channel independent histogram methods only utilize a fraction of the image data with values near the ends or extremes of the histogram data; most of the image data is ignored. Furthermore, individual color channel histograms do not maintain any linkage of channel information at the pixel level. In other words, unless the image is monochrome, the pixels for a particular level in the histogram for one channel correspond to many levels in the other channels. This lack of linkage can cause errors with the above described histogram methods, particularly when there are highly saturated colors and when there is clipping of the image data. Thus there is a need for an improved digital image processing method for automatically adjusting the color of a digital color image.

SUMMARY OF THE INVENTION

The present invention is directed to overcoming one or more of the problems set forth above. Briefly summarized, according to one aspect of the present invention, the invention resides in a method for adjusting the color reproduction of a color image composed of pixels provided in a plurality of color channels, where the method includes (a) generating a reference image from a combination of the color channels, whereby each spatial coordinate of the reference image is characterized by a reference image level; (b) generating channel averages of the color channel values of the pixels that correspond to each of at least two different valued reference image levels; (c) obtaining specific channel averages corresponding to a near white point and a near black point from the channel averages; and (d) utilizing the specific channel averages on a pixel by pixel basis for the respective channels of the digital color image to produce a processed digital color image having improved color reproduction.

The present invention has advantages in that it retains channel data linkage at the pixel level, minimizes the contribution of highly colored pixels in determining the white and black points, provides both gain and offset terms required to correct severe color biases, can be easily combined with masking techniques, and can be combined with additional digital image processing steps to further improve performance.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 4(a)–4(e) repeat the histograms and plots of FIGS. 3(a)–3(e) showing how pre-set cumulative percentiles are mapped to the channel average curves in order to obtain red, green and blue channel averages corresponding to a near white point and a near black point.

DETAILED DESCRIPTION OF THE INVENTION

Because image processing systems employing color correction and modification are well known, the present description will be directed in particular to attributes forming part of, or cooperating more directly with, the method in accordance with the present invention. Attributes of the method not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

Figure 1:
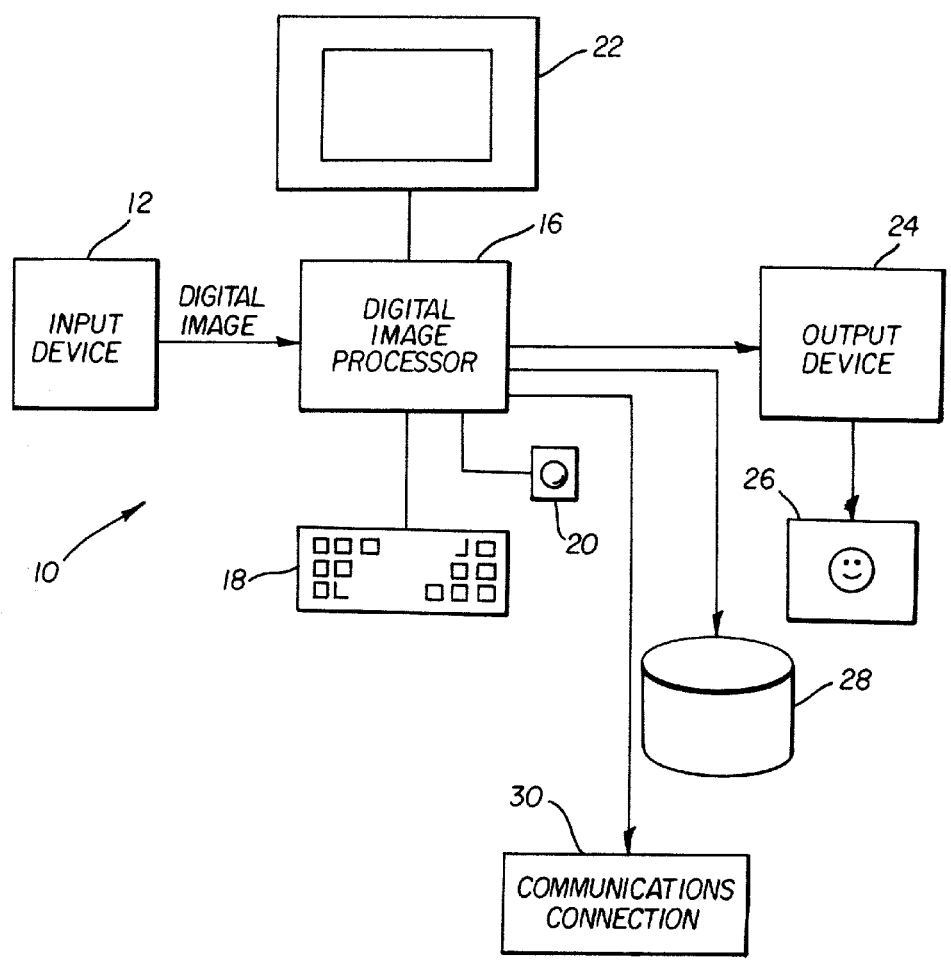
FIG. 1 is a schematic block diagram illustrating an image processing system suitable for performing the digital image processing method according to the present invention.

Referring to FIG. 1, an image processing system, generally designated 10, suitable for performing the image processing method of the present invention includes for example an input device 12, such as a scanner for scanning photographic film or prints, or a digital camera, for producing a digital image. Alternatively, digital images may be sourced from a digital data storage device and/or accessed via the World Wide Web, whereupon the input device 12 would include the storage device or a network access to the Web. The input device 12 produces a digital image signal having a plurality of color channels (e.g., red, green and blue) that are supplied to a digital image processor 16. The digital image processor 16 is a programmed computer and can be, for example, a general purpose digital computer such as a PC, or minicomputer, or a computer that is specially designed for processing digital images. The digital image processor 16 is provided with operator interface devices such as a keyboard 18 and a mouse 20. The system 10 may include display devices, such as a color monitor 22, and one or more output devices 24 connected to the digital image processor 16. The output device 24 may be as a color hardcopy printer (e.g, an ink jet or thermal printer) for producing a color hard copy print 26 of the processed digital image. The system may also include a digital image store 28, such as an optical disk storage unit for storing the processed images, and a communications connection 30, such as a modem for communicating the images to a remote location.

Figure 2:
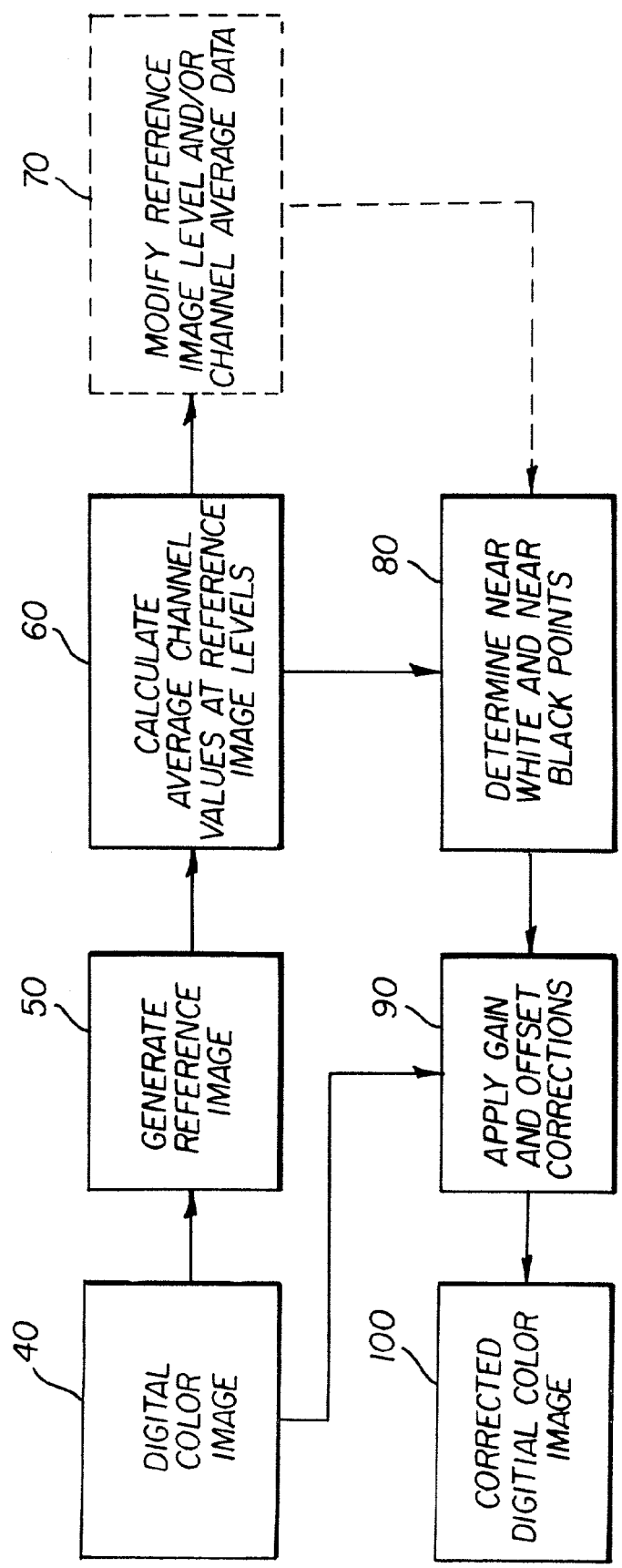
FIG. 2 is a schematic diagram illustrating the digital image processing method according to the present invention.

Referring to FIG. 2, the image processing method of the present invention includes the steps of generating (step 50) a reference image from the digital color image 40. Next, average channel values corresponding to reference image levels are calculated (step 60). While not required, improved channel averages are obtained by modifying reference image level information and channel averages (step 70). In order to calculate and apply gain and offset corrections, two reference image values, preferably from low and high level values, are determined (step 80). The low and high reference image levels are designated as the near black point and the near white points, respectively. The "near" designation is used without limitation to signify that, while these selected black and white points may correspond to true black and white points, they do not generally or necessarily correspond to or are corrected to the true black and white points in the image. In step 90, the near white and near black points are used to apply gain and offset corrections and to produce a corrected digital color image 100 from the digital color image 40. While not required to generate reference image levels in the simplest form of the invention, typically a histogram providing the reference image levels is also formed in step 60. Additional data from the histogram may be used to provide enhanced performance in the modifying step 70. The following description provides details of each of these steps.

The reference image is generated (step 50), for example, by forming a linear combination of the color channels in the digital color image. In general, when the image has red, green, and blue color channels, the reference image $W_{i,j}$ is generated as follows:

$$W_{i,j} = C_1 \times r_{i,j} + C_2 \times g_{i,j} + C_3 \times b_{i,j} \qquad \text{Eq. (1)}$$

where each value $W_{i,j}$ is the image value of the reference image W for the spatial coordinates i,j; $C_1$, $C_2$, and $C_3$ are positive or zero valued constants; and $r_{i,j}$, $g_{i,j}$ and $b_{i,j}$ are the values for the pixel located at spatial coordinates i,j of the red, green, and blue digital color image channels. The constants $C_1$, $C_2$, and $C_3$ may be set to sum to unity, for example, $C_1=C_2=C_3=\frac{1}{3}$, whereby if the code values of each channel of the digital image range from 0 to 255, the pixels of the reference image will be likewise restricted to range from 0 to 255, thereby facilitating further processing.

Next, channel averages CA, that is, the average of each channel for all pixels having a particular reference image value, are calculated (step 60) for least two different valued reference image levels. The calculation of the channel averages is detailed in the following equations (2a, 2b, 2c):

$$CAr(k) = \frac{\sum_{P(k)} r_{i,j}}{N(k)} \qquad \text{Eq. (2a)}$$

$$CAg(k) = \frac{\sum_{P(k)} g_{i,j}}{N(k)} \qquad \text{Eq. (2b)}$$

$$CAb(k) = \frac{\sum_{P(k)} b_{i,j}}{N(k)} \qquad \text{Eq. (2c)}$$

where: CAr(k) is the red channel average at the kth reference image level, CAg(k) is the green channel average at the kth reference image level, CAb(k) is the blue channel average at the kth reference image level, N(k) is the number of pixels in the kth reference image level, and P(k) are the pixels, with spatial coordinates i,j in the kth reference image level.

Figure 3A:
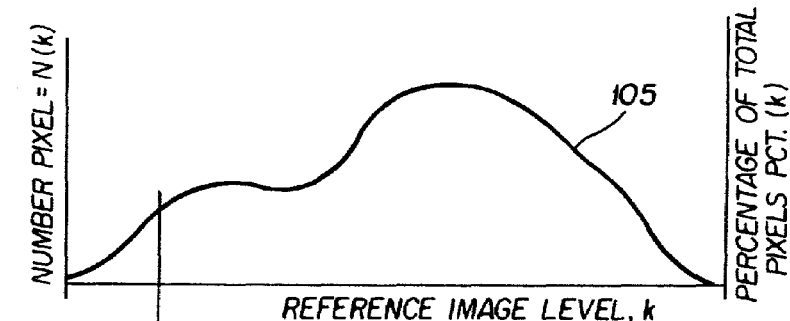
FIG. 3(a) is a histogram of a reference image illustrating how channel averages are formed.
Figure 3B:
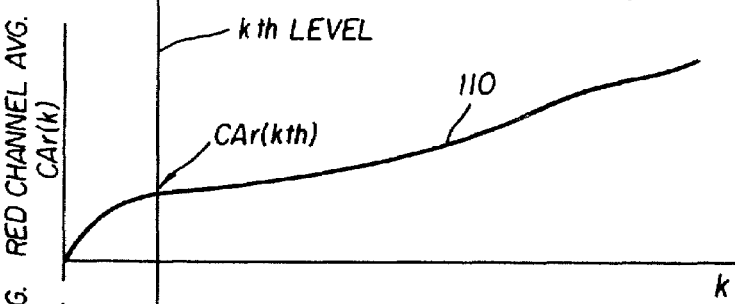
FIGS. 3(b), 3(c) and 3(d) are plots of the red, green and blue channel averages.
Figure 3C:
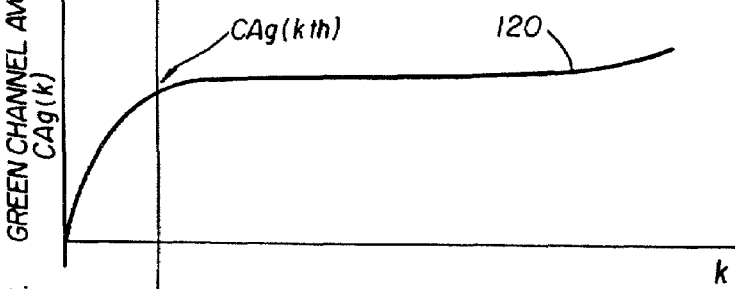
Figure 3D:
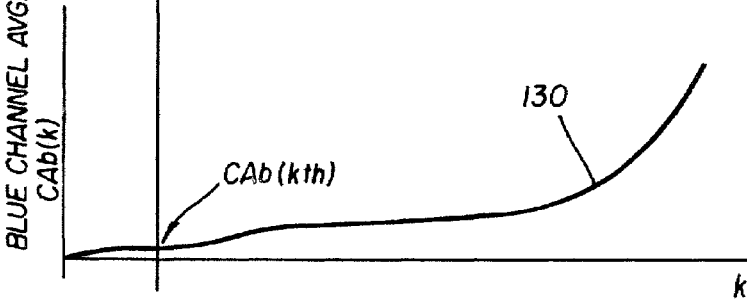

While only two different reference image levels are required in one embodiment of the invention, and they may be calculated directly by summing and averaging the value of all pixels constituting these two levels, forming a histogram of the reference image is one way of generating a larger plurality of reference image levels of the reference image. FIG. 3(a) shows a histogram 105 of the reference image W generated by the step 50. The histogram 105 is a graphical representation plotting the number of pixels N(k) on the ordinate axis versus reference image level k, which spans the range of reference image values, on the abscissa. Alternatively, FIG. 3(a) represents the percentage of pixels at each reference image level k, as indicated by the axis on the right side of FIG. 3(a). FIGS. 3(b), 3(c) and 3(d) share the same abscissa as FIG. 3(a) and are graphical representations plotting the red, green and blue channel averages CAr(k) 110, CAg(k) 120, and CAb(k) 130, respectively, versus the reference image level k. Note that FIGS. 3(b), 3(c) and 3(d) are NOT histograms as the ordinate axes are channel averages, NOT a number count or percentage. For any k value, red, green, and blue channel averages are calculated as indicated in equations (2a, 2b, 2c). Also note that in FIGS. 3(a), 3(b), 3(c) and 3(d) the reference image value that corresponds to the kth channel averages is the reference image level k.

Improved channel averages can be obtained by eliminating outlier pixel values using well-known statistical techniques such as eliminating pixels with values that are more than two standard deviations from the average value. In this case, channel averages are then recalculated having removed outliers from the averaging process.

Additional improvements to both the reference image or W histogram and channel averages at each W image level are possible. An example of such an improvement is to non-equally weight the value of each pixel used in calculating the reference image histogram and/or in calculating the average channel value at each reference image level. Example non-equal weightings include: eliminating or weighting pixels where one or more of the pixel channel values is at the maximum or minimum of the range of values observed in that channel, eliminating or weighting pixel values for pixels that form a border or lie at the outside edges of the digital color image, eliminating or weighting pixel values for pixels that are highly colored, and/or eliminating or weighting pixels based on the magnitude of the output from a high or band pass spatial filter representation of the digital color image. Using results from a high or band pass spatial filter as a weighting means is well known in the art; a good example is described in commonly assigned U.S. Pat. No. 4,731,671, which issued to Alkofer on Mar. 15, 1988.

If channel averages are calculated for more than two reference image values, even further improvements are possible including, but not limited to: (a) smoothing the W histogram and/or channel averages by combining W level values and/or channel averages from, or corresponding to, neighboring W levels, and/or (b) fitting the reference image values and/or channel averages to mathematical models.

An example of the aforementioned combination is to average channel averages corresponding to W levels below a certain percentile to obtain smoothed channel averages for the low, or near black point. In a like manner, averaging channel averages corresponding to W levels above a certain percentile is used to obtain the near white point. An example of the aforementioned mathematical model is, for each channel, to least squares fit with a model such as a low order polynomial, the channel averages from a group of W levels to their corresponding k values. A value predicted by the mathematical model at a selected k level would be used instead of an actual channel average value.

If channel averages, or modified channel averages as described above, corresponding to more than two reference image levels are calculated, then criteria is applied for selecting (step 80) the two reference image levels and the channel averages that correspond to these levels required to calculate straight line gain and offset.

Figure 3E:
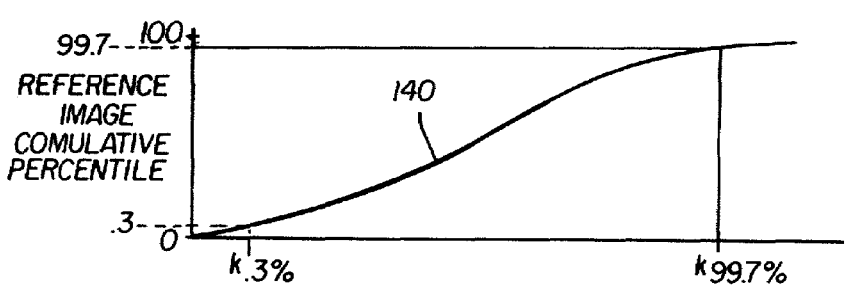
FIG. 3(e) is a cumulative reference image histogram.

An exemplary selection criteria for obtaining a near black point and a near white point may be based upon selecting channel averages from pre-set upper and lower percentiles from a cumulative reference image histogram as the aim reference image levels. As shown in FIG. 3(e), a cumulative reference image histogram 140 is formed by integrating the reference image histogram 105, and normalizing the abscissa by multiplying by 100 (to put in terms of percent) and dividing by the total number of pixels. Exemplary pre-set percentiles are the 0.3 percentile for the near black point and the 99.7 percentile for the near white point. Note that if the reference image histogram and channel averages data are not further modified, then a fixed percentile criteria corresponds to the case where channel averages need only be calculated at two reference image levels.

As shown generally in FIG. 4, the red, green and blue channel averages corresponding to the near black point and the near white point are obtained by mapping the reference image level k for the selected pre-set percentiles in FIG. 4(e), in this example the 0.3 percentile for the near black point and the 99.7 percentile for the near white point, upon the respective red, green and blue channel average curves in FIGS. 4(b), 4(c), and 4(d). More specifically, as shown generally in FIG. 4, $R_H$, $G_H$, and $B_H$ are the red, green, and blue channel averages corresponding to the near white point, and $R_L$, $G_L$, and $B_L$ are the red, green and blue channel averages corresponding to the near black point. As will be described shortly, these channel averages corresponding to the near black and near white values are used to correct the digital image in step 90.

Another example of selection criteria is one where in addition to generating a W image histogram, individual channel level histograms of the red, green and blue channel pixel data and cumulative histograms based on the individual channel level histograms, formed in an identical manner as previously described for the reference image, are also generated in step 60. At each W level, the individual channel histogram percentiles corresponding to the channel level averages are determined. These individual channel level percentiles can be combined, for example averaged, as shown in Equation (3):

$$PW(k) = \frac{D_1 \times PR(k) + D_2 \times PG(k) + D_3 \times PB(k)}{D_1 + D_2 + D_3} \qquad \text{Eq. (3)}$$

where: PW(k) is the weighted average of the channel level percentiles, PR(k) is the red channel level percentiles from the red channel cumulative histogram that corresponds to the red channel average at the kth reference image level, PG(k) is the green channel level percentiles from the green channel cumulative histogram that corresponds to the green channel average at the kth reference image level, PB(k) is the blue channel level percentiles from the blue channel cumulative histogram that corresponds to the blue channel average at the kth reference image level, and $D_1$, $D_2$, and $D_3$ are weighting constants.

The near white point is selected from the weighted averaged channel level percentiles PW(k) or from a combination of the average of the individual channel level percentiles and the W percentiles. For example, the near black point is chosen as the W level where the averaged channel level percentiles is lowest and the near white point is chosen as the W level where the averaged channel level percentiles is highest. These levels are not necessarily the same as the highest and lowest W levels. In either case, the calculated percentiles are converted into their corresponding reference image levels on the W cumulative histogram (as in FIG. 3(e)) and mapped onto the channel average curves as generally shown in connection with FIG. 4 to obtain the aim values $R_H$, $G_H$, and $B_H$ (the red, green, and blue channel averages corresponding to the near white point) and $R_L$, $G_L$, and $B_L$ (the red, green and blue channel averages corresponding to the near black point).

These near black and near white values are used to correct the digital image in step 90. For example, if the subsequent imaging steps, such as rendering, have known aim values for these near white and near black points, the digital image is corrected by using these aim values and the near black and near white points according to Equations (4a, 4b and 4c):

$$r'_{i,j} = \left(\frac{Wt - Bk}{R_H - R_L}\right) \times (r_{i,j} - R_L) + Bk \qquad \text{Eq. (4a)}$$

$$g'_{i,j} = \left(\frac{Wt - Bk}{G_H - G_L}\right) \times (g_{i,j} - G_L) + Bk \qquad \text{Eq. (4b)}$$

$$b'_{i,j} = \left(\frac{Wt - Bk}{B_H - B_L}\right) \times (b_{i,j} - B_L) + Bk \qquad \text{Eq. (4c)}$$

where: Wt and Bk are the aim near white point and near black point rendering values, $R_H$, $G_H$, and $B_H$ are the red, green, and blue channel averages corresponding to the near white point, $R_L$, $G_L$, and $B_L$ are the red, green and blue channel averages corresponding to the near black point, and $r'_{i,j}$, $g'_{i,j}$, and $b'_{i,j}$ are the values for the pixel located at spatial coordinates i,j of the corrected digital color image.

Alternatively, the correction of the digital image by this method may be applied as part of a series of image processing steps and in order to avoid degradations, such as clipping, the correction can be applied by mapping to intermediate values with sufficient headroom to accommodate subsequent image processing steps. A correction that provides individual correction while maintaining the reference image values at the near white and black points is:

$$r'_{i,j} = \left(\frac{W_H - W_L}{R_H - R_L}\right) \times (r_{i,j} - R_L) + W_L \qquad \text{Eq. (5a)}$$

$$g'_{i,j} = \left(\frac{W_H - W_L}{G_H - G_L}\right) \times (g_{i,j} - G_L) + W_L \qquad \text{Eq. (5b)}$$

$$b'_{i,j} = \left(\frac{W_H - W_L}{B_H - B_L}\right) \times (b_{i,j} - B_L) + W_L \qquad \text{Eq. (5c)}$$

where:
$$W_H = \frac{C_1 \times R_H + C_2 \times G_H + C_3 \times B_H}{3} \text{ and}$$

$$W_L = \frac{C_1 \times R_L + C_2 \times G_L + C_3 \times B_L}{3}$$

An improved correction method limits the amount of this correction that is applied. This limiting is typically based on additional information obtained from the digital image. The following three equations (6a, 6b and 6c) describe how a limited amount of correction can be applied, based on limiting factor f:

$$r'_{i,j} = \left[\frac{(W_H - W_L) \times f + (R_H - R_L) \times (1 - f)}{(R_H - R_L)}\right] \times (r_{i,j} - R_L) + W_L \times f + R_L \times (1 - f) \qquad \text{Eq. (6a)}$$

$$g'_{i,j} = \left[\frac{(W_H - W_L) \times f + (G_H - G_L) \times (1 - f)}{(G_H - G_L)}\right] \times (g_{i,j} - G_L) + W_L \times f + G_L \times (1 - f) \qquad \text{Eq. (6b)}$$

$$b'_{i,j} = \left[\frac{(W_H - W_L) \times f + (B_H - B_L) \times (1 - f)}{(B_H - B_L)}\right] \times (b_{i,j} - B_L) + W_L \times f + B_L \times (1 - f) \qquad \text{Eq. (6c)}$$

An example of the limiting factor is calculated from determining how constant the image color is at various W image levels. One method for determining color saturation constancy is to average all of the chroma values $Chr_{i,j}$ obtained from each of the pixels and compare this average to a chroma value Ch based on the average over all pixels. Limiting factor f is then calculated from Equation (7):

$$f = \frac{Ch}{\left(\frac{\sum_{i,j} Chr_{i,j}}{N}\right) + x} \quad \text{Eq. (7)}$$

where:

x is a positive constant to avoid division by zero, N is the number of pixels, $$Ch = \frac{\sum_{i,j} r_{i,j}^2 + \sum_{i,j} g_{i,j}^2 + \sum_{i,j} b_{i,j}^2 - \sum_{i,j} r_{i,j} \times g_{i,j} - \sum_{i,j} r_{i,j} \times b_{i,j} - \sum_{i,j} g_{i,j} \times b_{i,j}}{N}$$

and at each pixel $$Chr_{i,j} = r_{i,j}^2 + g_{i,j}^2 + b_{i,j}^2 - r_{i,j} \times g_{i,j} - r_{i,j} \times b_{i,j} - g_{i,j} \times b_{i,j}$$

Those skilled in the art will appreciate that the above chroma values could be calculated and averaged based upon channel averages instead of pixel values.

In addition, those skilled in the art will appreciate that the formation of the reference image histogram, the near black and relative white point determinations, and individual channel independent color histograms can be performed with a single pass through the pixel data, thus minimizing the computational requirements for this method.

The present invention is useful, for example, for correcting the color reproduction of images that have experienced dye fading, images that were exposed under water or with tungsten or fluorescent illumination using daylight balanced film, or images derived from photographic prints that were incorrectly printed. After the digital image has been processed according to the present invention, it may be further processed, for example, by applying further tone scale adjustment algorithms.

The digital image produced by the current invention can be further processed by applying individual color channel independent tone scale modifications such as those described in the above mentioned U.S. Pat. Nos. 5,265,200 and 5,812,286.

The digital image produced by the current invention, or the further processed image just described can also be further processed by applying a color matrixing operation of the type disclosed in U.S. Pat. No. 5,673,336 issued Sep. 30, 1997 to Edgar et al., wherein a matrix is determined by crosscolor correlations from noise patterns identified in the image.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example: magnetic storage media such as a magnetic disc (e.g. a floppy disc or a hard drive) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image processing system
12 input device
16 digital image processor
18 keyboard
20 mouse
22 color monitor
24 output device
26 color hardcopy print
28 digital image store
30 communications connection
40 digital color image
50 generating a reference image
60 calculating average channel values
70 modifying reference level information and channel averages
80 generating reference image values from low and high level values
90 applying gain and offset corrections
100 corrected digital color image
105 histogram
110 red channel average
120 green channel average
130 blue channel average
140 cumulative reference image histogram

What is claimed is:

1. A digital color image processing method for adjusting the color reproduction of a color image composed of pixels provided in a plurality of color channels, said method comprising the steps of:
   (a) generating a reference image from a combination of values of the pixels in the color channels, whereby each spatial coordinate of the reference image is characterized by a reference image level;
   (b) generating channel averages of the color channel values of the pixels that correspond to each of at least two different valued reference image levels;
   (c) obtaining specific channel averages corresponding to a near white point and a near black point from the channel averages; and (d) utilizing the specific channel averages on a pixel by pixel basis for the respective channels of the digital color image to produce a processed digital color image having improved color reproduction.

2. The image processing method claimed in claim 1, further comprising the step of generating a cumulative histogram of the reference image and selecting specific percentiles of the cumulative histogram as the near white point and the near black point.

3. The image processing method as claimed in claim 2, wherein the step (b) of generating channel averages comprises generating a plurality of channel averages corresponding to substantially all of the reference image levels of the reference image.

4. The image processing method claimed in claim 3, wherein the step (c) of obtaining specific channel averages comprises mapping reference image levels corresponding to the specific percentiles from the cumulative histogram into the plurality of channel averages obtained in step (b).

5. The image processing method as claimed in claim 1, wherein the specific percentiles are a weighted average of percentiles obtained from individual color channel level histograms of the color channel pixel data and their corresponding cumulative histograms.

6. The image processing method as claimed in claim 1, wherein the step (d) of utilizing the specific channel averages on a pixel by pixel basis for the respective channels of the digital color image comprises adjusting the value of the pixels in each of the color channels by using aim values for the near white and near black points in combination with the specific channel averages.

7. The image processing method as claimed in claim 1, wherein the step (d) of utilizing the specific channel averages on a pixel by pixel basis for the respective channels of the digital color image comprises adjusting the value of the pixels in each of the color channels by mapping to intermediate values with sufficient headroom to accommodate image processing steps.

8. The image processing method claimed in claim 1, wherein the step (d) of utilizing the specific channel averages on a pixel by pixel basis for the respective channels of the digital color image comprises adjusting the value of the pixels in each of the color channels by limiting the amount of adjustment based on a limiting factor related to the constancy of the image color at various reference image levels.

9. The image processing method as claimed in claim 8 wherein the color saturation constancy is determined by relating the overall average chroma value of the image to the average of the chroma values summed over the image.

10. The image processing method claimed in claim 1, wherein the color channels are red, green and blue.

11. The image processing method claimed in claim 1, wherein the reference image is a linear combination of the color channels.

12. The image processing method claimed in claim 11, wherein the linear combination is expressed as $$W_{i,j}=C_1 \times r_{i,j}+C_2 \times g_{i,j}+C_3 \times b_{i,j},$$

where $C_1$, $C_2$, and $C_3$ are positive or zero valued constants and $r_{i,j}$, $g_{i,j}$, and $b_{i,j}$ are the values for the pixel located at coordinates i,j of the red, green, and blue digital color image channels.

13. The image processing method claimed in claim 12, wherein $C_1$, $C_2$, and $C_3$ sum to unity.

14. The image processing method claimed in claim 13, wherein $C_1$, $C_2$, and $C_3=\frac{1}{3}$.

15. The image processing method claimed in claim 1, further comprising the step of further processing the processed digital image to adjust tone scale.

16. The image processing method claimed in claim 1, further comprising the step of applying a color matrixing operation to the processed image.

17. The image processing method claimed in claim 16, wherein a color matrix employed in the matrixing operation is determined by crosscolor correlations from noise patterns identified in the image.

18. A computer program product for performing the method of claim 1, the computer program product comprising computer readable storage medium having a computer program stored thereon.

19. A digital color image processing system for adjusting the color reproduction of a color image composed of pixels provided in a plurality of color channels, said system comprising:
  (a) means for generating a reference image from a combination of values of the pixels in the color channels, whereby each spatial coordinate of the reference image is characterized by a reference image level;
  (b) means for generating channel averages of the color channel values of the pixels that correspond to each of at least two different valued reference image levels;
  (c) means for obtaining specific channel averages corresponding to a near white point and a near black point from the channel averages; and
  (d) means for utilizing the specific channel averages on a pixel by pixel basis for the respective channels of the digital color image to produce a processed digital color image having improved color reproduction.

20. The image processing system claimed in claim 19, further comprising means for generating a cumulative histogram of the reference image and selecting specific percentiles of the cumulative histogram as the near white point and the near black point.

* * * * *